(12) United States Patent
Ohata et al.

(10) Patent No.: US 9,661,836 B2
(45) Date of Patent: May 30, 2017

(54) FISHING ROD HOLDER

(71) Applicants: Michael Leslie Asato Ohata, Merrit (CA); Jeanette Nicola Ohata, Merrit (CA)

(72) Inventors: Michael Leslie Asato Ohata, Merrit (CA); Jeanette Nicola Ohata, Merrit (CA)

( * ) Notice: Subject to any disclaimer, the term of this patent is extended or adjusted under 35 U.S.C. 154(b) by 357 days.

(21) Appl. No.: 13/685,974

(22) Filed: Nov. 27, 2012

(65) Prior Publication Data

US 2014/0144064 A1    May 29, 2014

(51) Int. Cl.
    *A01K 97/10*      (2006.01)
    *A01K 87/08*      (2006.01)

(52) U.S. Cl.
    CPC .............. *A01K 97/10* (2013.01); *A01K 87/08* (2013.01)

(58) Field of Classification Search
    CPC ......... A01K 97/00; A01K 97/10; A01K 87/08
    USPC .... 43/21.2, 25, 26, 54.1; 224/219, 221, 222, 224/917, 917.5, 922
    See application file for complete search history.

(56) References Cited

U.S. PATENT DOCUMENTS

| | | | | |
|---|---|---|---|---|
| 1,724,069 A | * | 8/1929 | Butera | A41H 31/00 223/108 |
| 1,761,497 A | | 6/1930 | Smith | |
| 1,786,254 A | | 12/1930 | Meehan | |
| 1,982,248 A | * | 11/1934 | Edwin | 132/296 |
| 2,212,212 A | * | 8/1940 | Planitz | 224/222 |
| 4,628,925 A | * | 12/1986 | Witzel | A61F 5/3761 128/878 |
| 4,896,465 A | | 1/1990 | Rhodes et al. | |
| 5,159,775 A | | 11/1992 | Sutula, Jr. | |
| 5,212,900 A | | 5/1993 | Perry | |
| D353,262 S | * | 12/1994 | Cantavespre et al. | D3/221 |
| 5,915,535 A | * | 6/1999 | Henrekin-Jordan | A41F 9/002 2/171 |
| 5,941,012 A | | 8/1999 | Dominguez | |
| 6,138,976 A | * | 10/2000 | Fahringer, Sr. | 248/518 |
| 6,357,639 B1 | | 3/2002 | Williams | |
| 6,371,346 B1 | * | 4/2002 | Sharma | B60R 11/02 224/553 |
| 7,533,485 B2 | | 5/2009 | Nyland | |
| D628,265 S | | 11/2010 | Schwartz | |
| D650,531 S | * | 12/2011 | Young | D29/120.1 |
| 2004/0200868 A1 | * | 10/2004 | Woodman | 224/221 |

(Continued)

FOREIGN PATENT DOCUMENTS

| | | |
|---|---|---|
| CA | 2009341 | 7/1991 |
| GB | 2444318 | 6/2008 |
| GB | 2461951 | 1/2010 |

OTHER PUBLICATIONS www.rodsaver.com/04_gear/pole-saver.html Accessed Aug. 3, 2012.

*Primary Examiner* — Thien Thanh Pham
(74) *Attorney, Agent, or Firm* — Richard D. Okimaw

(57) ABSTRACT

An apparatus for securing a fishing rod proximate to the arm of a user comprises a strap sized to extend around an arm of a user, a block extending from the strap and a finger extending substantially tangentially from the strap proximate to the block, the finger having a free distal end overlying the block wherein the protrusion and the block form a void sized to retain a fishing rod therein substantially parallel to the arm of the user.

10 Claims, 6 Drawing Sheets

(56) References Cited

U.S. PATENT DOCUMENTS

2006/0186150 A1\* 8/2006 Willows .................. A45F 3/00
                                                    224/222
2010/0237113 A1\* 9/2010 Brunelle Wright ...... A45C 1/06
                                                    224/222

\* cited by examiner

FISHING ROD HOLDER

BACKGROUND OF THE INVENTION

1. Field of Invention

The present invention relates to object holders in general and in particular to method and apparatus for holding fishing rods.

2. Description of Related Art

In many fields it is commonly required to hold an object while a user's hands are busy doing other activities. One such activity is fishing, in particular fly fishing, where a fisher may frequently need to hold a fishing rod while leaving one or more of their hands free to do another activity.

In particular, when the fisher is retrieving their fishing line rapidly, one common method that may be used is called stripping in which a user pulls the fishing line in quickly by hand to allow it to rest on the ground. A common stripping method is to hold the fishing rod and line with one hand and pulling in the fishing line with the other hand. During stripping, the fisher uses alternating hands to pull in or hold the fishing line.

It will be appreciated that during conventional stripping methods, a user has only one hand available to pull or retrieve the fishing line as the other hand is required to hold the fishing rod. Using conventional stripping methods, the user's other hand is commonly held at a steady location on the fishing rod so as to maintain control of the fishing rod. Accordingly, the user's rod hand is only commonly utilized to hold or stabilize the fishing line between alternating pulls by the user's free hand.

An additional difficulty with conventional stripping methods is that as the user is required to intermittently hold both the fishing rod and the fishing line with the same hand at the same time, a greater degree of manual dexterity is required. Accordingly, there will be a greater risk of a user dropping the fishing rod, fishing line or both during such periods. This may be particularly possible at times when the user is transitioning the fishing line to and from their rod holding hand.

SUMMARY OF THE INVENTION

According to a first embodiment of the present invention there is disclosed an apparatus for securing a fishing rod proximate to the arm of a user. The apparatus comprises a strap sized to extend around an arm of a user, a block extending from the strap and a finger extending substantially tangentially from the strap proximate to the block, the finger having a free distal end overlying the block wherein the protrusion and the block form a void sized to retain a fishing rod therein substantially parallel to the arm of the user.

The finger may comprise an elongate rod. The elongate rod may have a pliable outer layer. At least one of the block or the finger may include bristles extending therefrom towards the other of the block or finger.

The strap may include a retaining member having a tangential bore extending therethrough, wherein the finger is received within the tangential bore. The retaining member may comprise a sleeve surrounding a portion of the strap. The sleeve may be slidably movable on the strap.

The block may comprise a tubular member having a bore therethrough sized to receive a portion of the strap therethrough. The block may be slidably movable on the strap.

The strap may include a length adjustment. The length adjustment may be selected from the group consisting of hook and loop fasteners, buckles or frictional adjusters. The strap may include padding disposed on an interior surface thereof.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
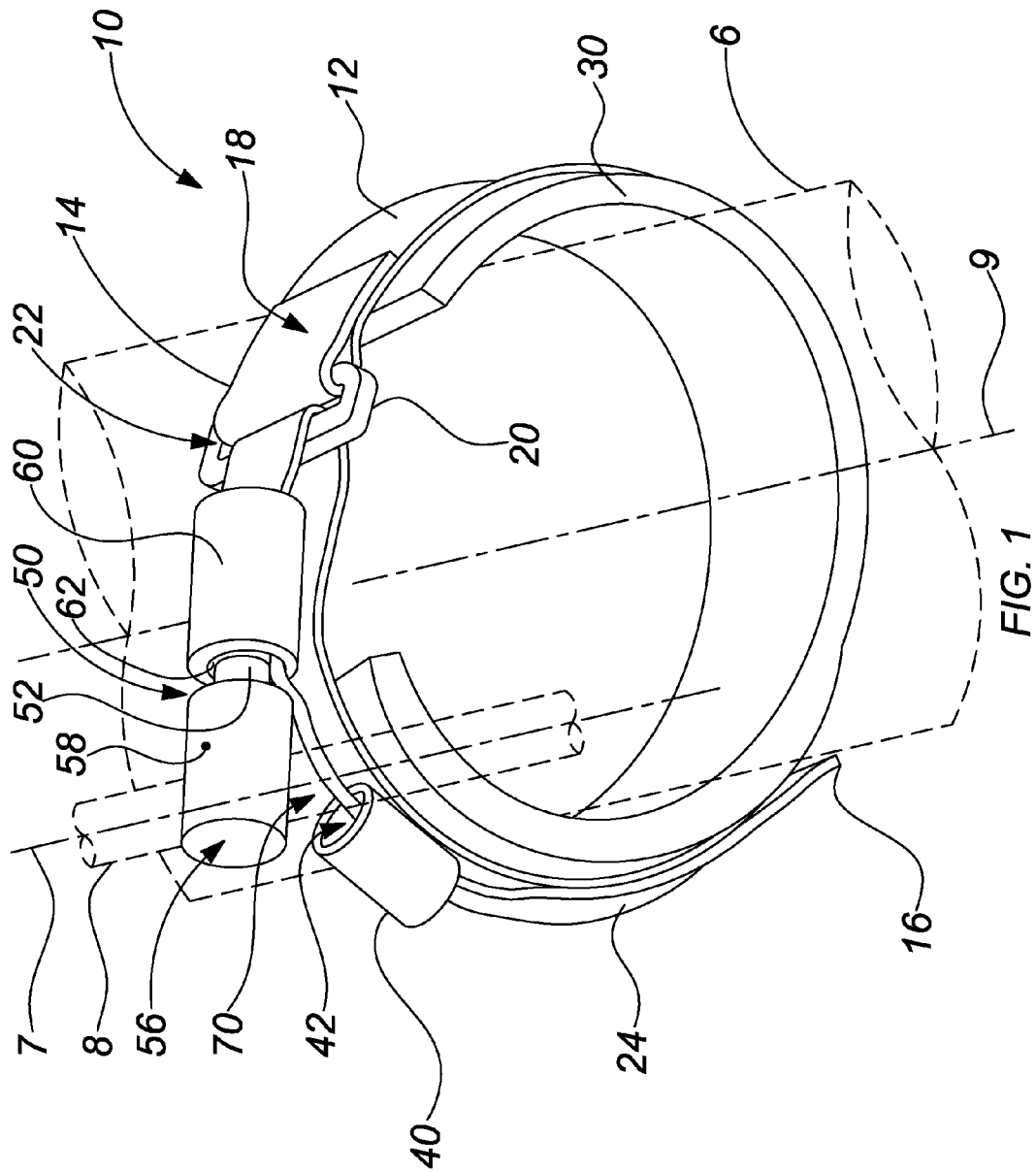
FIG. 1 is a perspective view of an apparatus for holding a fishing rod according to a first embodiment of the present invention.

Referring to FIG. 1, an apparatus for holding a fishing rod according to a first embodiment of the invention is shown generally at 10. The apparatus 10 comprises a strap sized to extend around an arm of a user. The strap 12 has a block 40 extending therefrom and a finger 50 extending substantially tangentially from the strap proximate to the block. The finger overlies the block 40 to form a void 70 sized to retain a fishing rod 8 therein. As illustrated in FIG. 1, the fishing rod 8 is retained within the void in an orientation substantially parallel to the arm 6 of a user.

Figure 3:
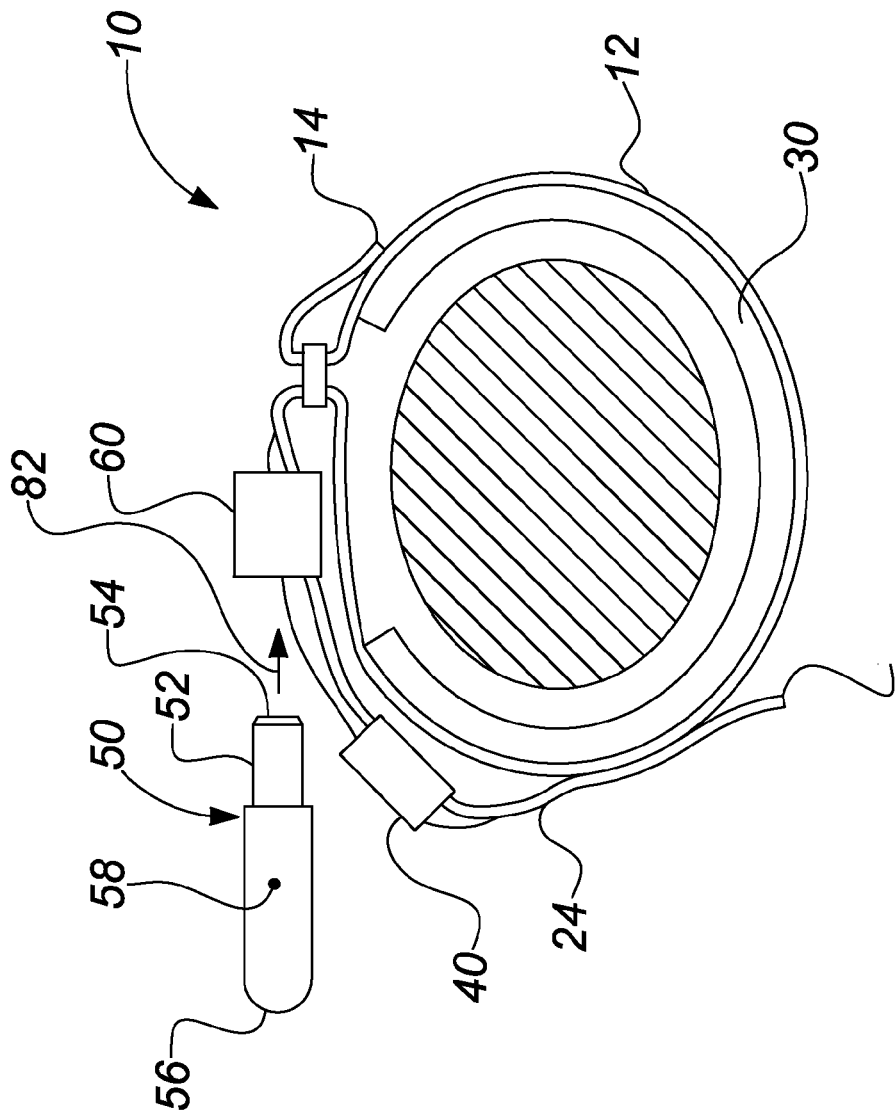
FIG. 3 is a side view of the apparatus of FIG. 1 at a closed position with a retaining finger being inserted thereinto.

The strap 12 comprises an elongate flexible member extending between first and second ends, 14 and 16, respectively. The first end 14 may include a doubled over portion 18 capturing a loop 20 therein. The loop 20 comprise a continuous band of material having an opening 22 therethrough. The doubled over portion 18 may be secured to the main portion of the strap by any conventional means, such as sewing, adhesives or fasteners. The second end 16 is includes a free distal end 24 which may be passed through the opening 22 so as to be doubled back on the strap 12 as illustrated in FIGS. 1 and 3. The free distal end 24 and at least a portion of the strap include cooperating portions of hook and loop fasteners so as to permit the strap 12 to be formed into a continuous loop as illustrated in FIGS. 1 and 3. It will be observed that the loop 20 in combination with the hook and loop fasteners serve to function as a length adjusting means for adjusting the size of the strap around the wrist of a user. It will also be appreciated that other length adjusting means may also be utilized as are commonly known, such as, by way of non-limiting example, buckles or frictional strap adjusters.

The strap 12 has a length sufficient to extend around the arm, and in particular the wrist of a wearer, such as, by way of non-limiting example, between 8 and 24 inches (203 and 610 mm) with a length of between 12 and 20 inches (305 and 510 mm) being particularly useful. The strap 12 may be formed of any suitable flexible material, such as, by way of non-limiting example, fabric, leather, nylon, neoprene or cotton. As illustrated, in FIG. 1, the strap may also optionally include a padding layer 30 disposed on an inner surface thereof to improve the comfort of the wearer. The padding layer 30 may be selected from any commonly known padding type, such as, foam rubber, foam, cotton, rubber, neoprene or inflatable bladders by way of non-limiting example.

The block 40 comprises a body located along the free end distal end 24 of the strap having a passage 42 therethrough sized to pass the free distal end. The passage 42 may be selected to have a size sufficient to permit the block 40 to be slidably movable along the free distal end 24 of the strap so as to permit repositioning thereof. The block 40 may have any shape desired by a user, such as rectangular, tubular or irregular. As illustrated in FIG. 1, the block 40 may comprise a tubular member having a bore therethrough sized to pass the free distal end 24 of the strap. The block 40 will also have a size selected to provide a sufficient void region to capture and retain the fishing rod, as further described below.

The finger 50 comprises an elongate member extending substantially tangentially from the strap 12. As illustrated in FIGS. 1 through 4, the finger may comprise a rod 52 extending between proximate and distal ends, 54 and 56, respectively. The proximate end 54 is received within a retaining member 60 located along the strap 12 where as the distal end 56 is cantilevered therefrom. The retaining member 60 comprises a body having a passage 62 therethrough sized and shaped to correspond to the rod 52 so as to permit the rod to be located therein. The passage 62 may also pass the free distal end 24 of the strap 12 therethrough so as to align the passage 62 with the strap 12. It will be appreciated that such alignment of the passage serves to orient the rod to extend tangentially from the strap 12. Optionally, the free distal end 24 of the strap 12 and the rod 52 may extend through separate parallel passages in the retaining member 60. As illustrated, the retaining member 60 may be formed as a sleeve or substantially tubular member such that the passage has a substantially circular cross section. It will also be appreciated that the passage 62 may have other cross sections corresponding to the shape of the rod 52.

As illustrated in FIG. 1, the rod 52, when inserted into the passage 62 of the retaining member 60 extends from the retaining member 60 by a distance sufficient to extend over the block 40. The rod 52 may be selected to have a length between 1 and ½ and 4 inches (38 and 102 mm) to permit it to extend from the retaining member 60 by a distance of between 1 and 3 inches (25 and 76 mm) although it will be appreciated that other lengths may be useful as well depending upon the size of the fishing rod to be used as well as the size of the fishes that are intended to be caught. The rod 52 may be formed of any suitable rigid or semi-rigid material, such as, by way of non-limiting example, wood, plastic or metal. In such a manner, a void 70 is formed between the rod 52, the block 40 and the free distal end 24 of the strap. The void 70 has a size sufficient to secure a fishing rod 8 therein which may be selectably located therein by a user. Once a fishing rod is located therein, an axis 7 of the fishing rod 8 will be aligned substantially parallel to the axis 9 of the arm of the user as illustrated in FIG. 1. Optionally, the rod may include a cushioning outer layer 58 over at least a portion thereof to reduce wear and damage to the fishing rod 8, such as by way of non-limiting example, neoprene, foam, rubber, silicone, foam rubber or fabrics. As illustrated, the distal end 56 of the rod 52 may also be rounded or otherwise profiled to reduce sharp edges thereon so as to further reduce wear and damage to the fishing rod 8.

Figure 2:
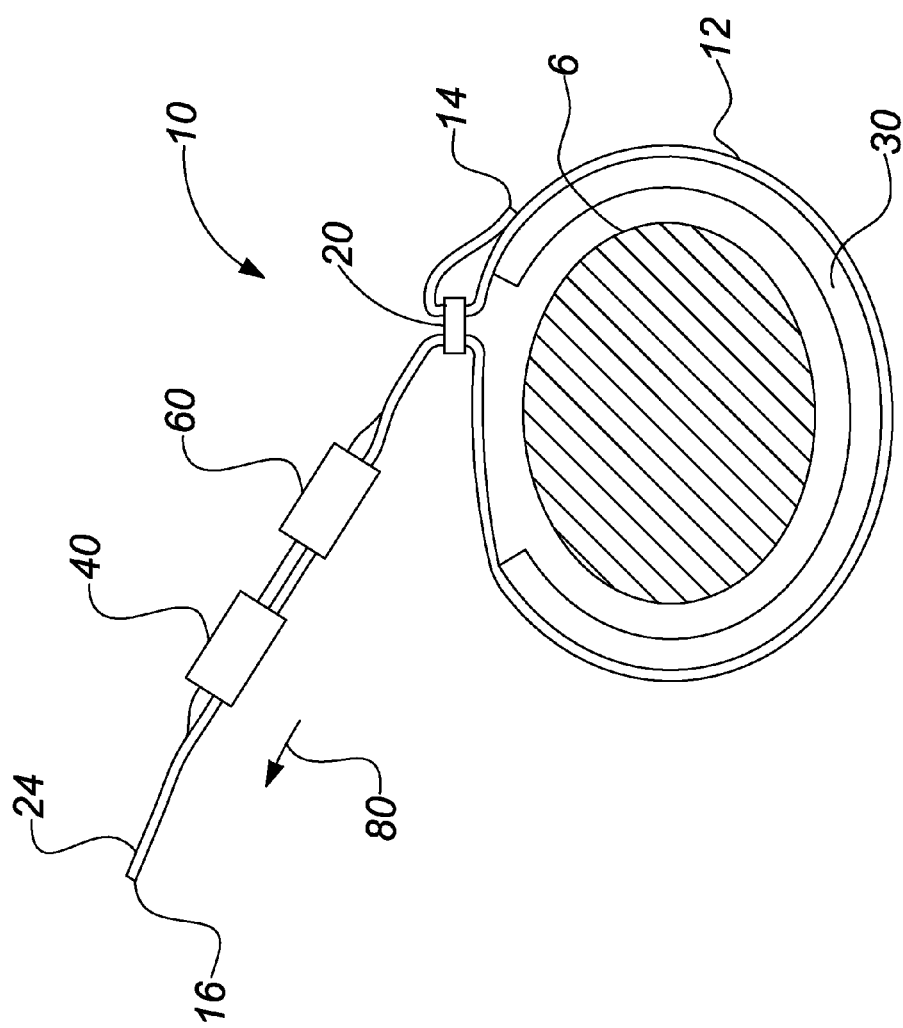
FIG. 2 is a side view of the apparatus of FIG. 1 at an open position.

In operation, a user may locate the strap around their arm 8 with the free distal end 24 of the strap being unsecured to the strap 12 as illustrated in FIG. 2. Thereafter, the user may pull on the free distal end 24 in a direction generally indicated at 80 so as to tighten the strap around their arm 8 as desired. It will be appreciated that the block 40 and retaining member 60 are slidable on the free distal end 24 so as to permit the user to position these two members at a desired location around their wrist. With reference to FIG. 3, once the strap 12 is secured on the users wrist, the rod 52 may be inserted into the passage 62 of the retaining member 60 in a direction generally indicated at 82 so as to position the distal end 56 thereof over the block 40.

Figure 4:
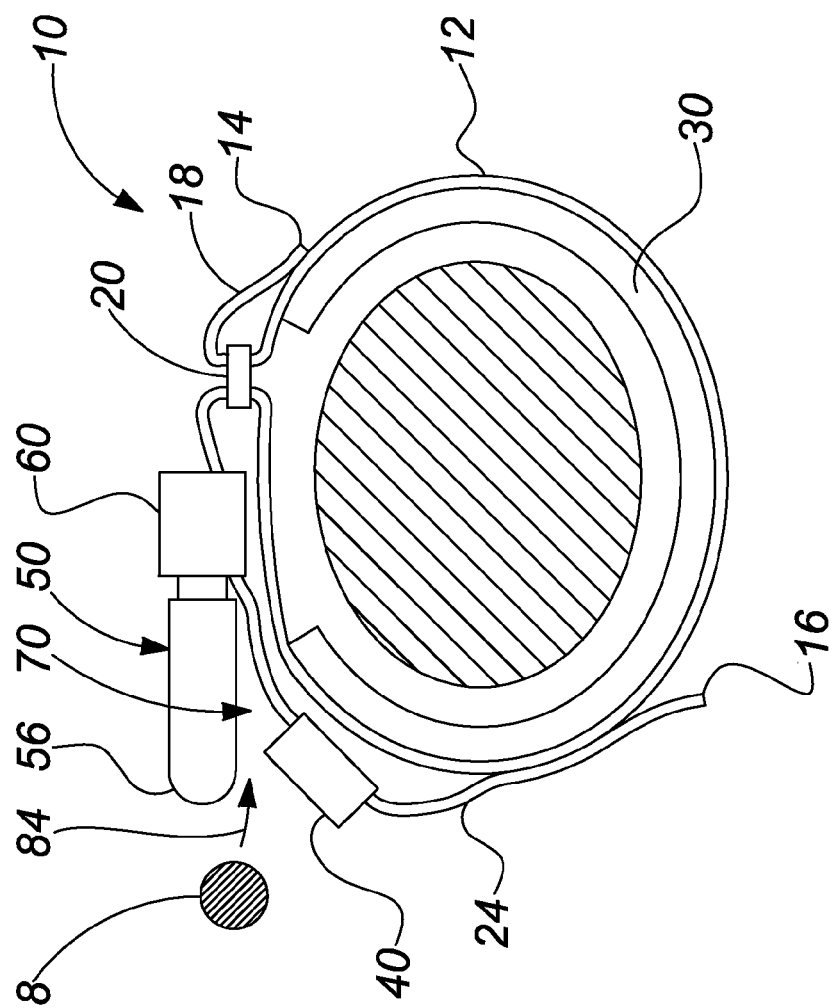
FIG. 4 is a side view of the apparatus of FIG. 1 with a fishing rod being inserted thereinto.

When a user desires to retain a fishing rod within the apparatus, the fishing rod may be introduced into the void 70 by pressing the fishing rod between the distal end 56 and the block in a direction generally indicated at 84 in FIG. 4.

Figure 5:
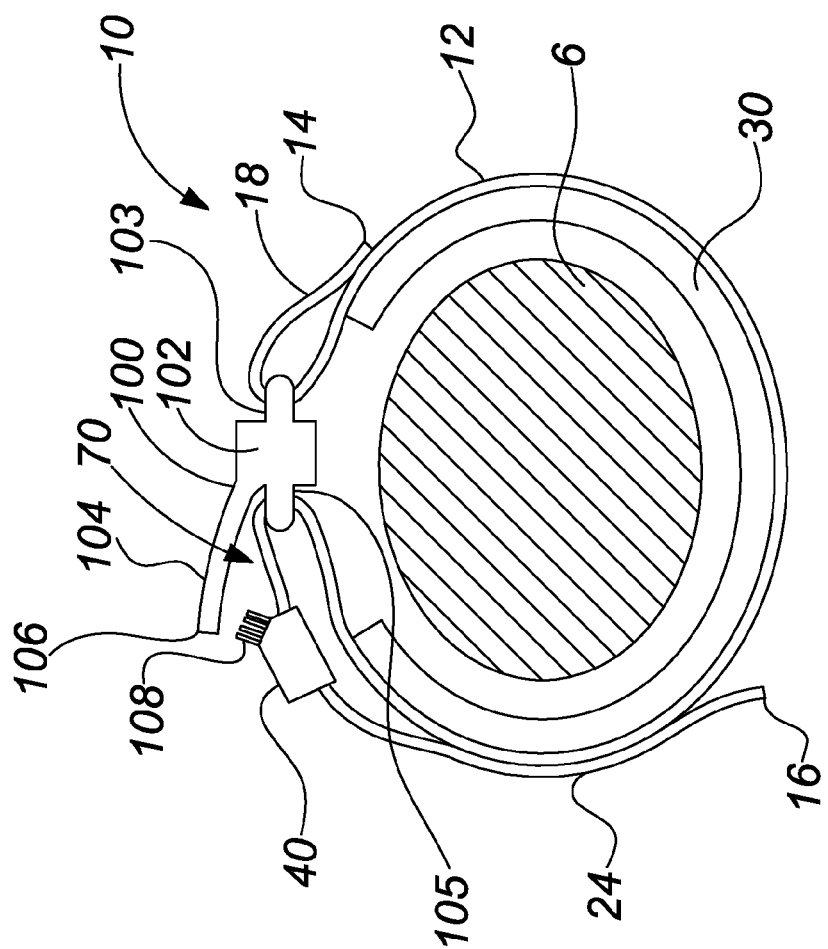
FIG. 5 is a side view of an apparatus for holding a fishing rod according to a further embodiment of the present invention.

With reference to FIG. 5, an alternative embodiment of the present invention is illustrated having a permanent finger 100 extending substantially tangentially from the strap. The permanent finger 100 comprises a body portion 102 and elongate finger portion 104 extending therefrom. The body portion 102 may include a first loop portion 103 extending therefrom sized to pass the first end 14 of the strap 12 through wherein the strap may be doubled back on and secured to itself as illustrated. The body portion 102 may also include a second loop portion 105 extending therefrom below the elongate finger portion 104 sized to pass the second end 16 of the strap 12 through wherein the strap may be doubled back on and selectably and adjustably secured to itself as illustrated by fasteners, such as, hook and loop fasteners or the like. The finger portion 104 extends to a distal end 106 adapted to overlie the block 40 so as to form a void 70 therewith. Optionally the block or permanent finger 100 may include bristles 108 extending therefrom so as to assist in retaining a fishing rod within the void.

Figure 6:
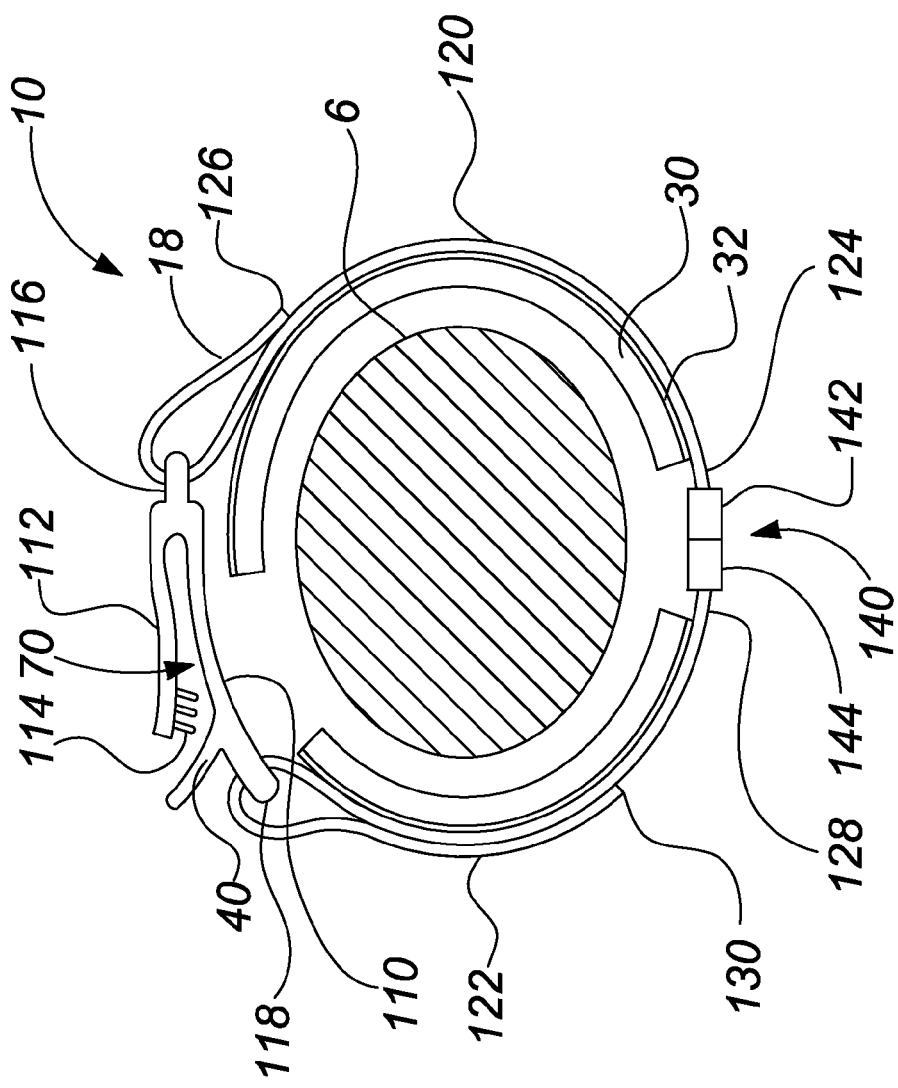
FIG. 6 is a side view of an apparatus for holding a fishing rod according to a further embodiment of the present invention.

With reference to FIG. 6, an alternative embodiment of the present invention is illustrated having common retainer element 110 having a finger 112 and block 40 being commonly formed therewith. The retainer element 110 may include first and second retaining loops, 116 and 118, respectively sized to pass the strap 12 through wherein the strap may be doubled back on and secured to itself. The finger 112 extends to a distal end at a position proximate to the block 40 so as to form a void 70 therewith. Optionally the block 40 or finger 112 may include bristles 114 extending therefrom so as to assist in retaining a fishing rod within the void. Optionally, the strap may be formed of one or more straps, 120 and 122, respectively connected to each other with a buckle 140 or the like. The first strap 120 may be passed through the first retaining loop 116 and the free end 126 thereof secured to itself. The second strap 122 may be passed through the second retaining loop 118 and the free end 130 thereof secured to itself. The buckle may be formed of first and second buckle portions, 142 and 144 of any known type which are each adjustably or fixedly attached to the corresponding ends 124 and 128 of the first and second straps 120 and 122. Optionally, the padding layer 30 may have a rigid or partially rigid backing layer 32 applied thereto to correspond to the shape of the user's wrist.

While specific embodiments of the invention have been described and illustrated, such embodiments should be considered illustrative of the invention only and not as limiting the invention as construed in accordance with the accompanying claims.

What is claimed is:

1. An apparatus for securing a fishing rod proximate to an arm of a user, the apparatus comprising:
   a strap sized to extend around an arm of a user;
   a retaining member having a tangential bore extending longitudinally through first and second ends of said retaining member, wherein said strap passes through said tangential bore in a first direction around the arm of the user;
   a block having a bore therethrough having said strap through said bore in said first direction around the arm of the user; and
   a finger removably securable within said second end of said retaining member and extending from said tangential bore of said retaining member proximate to said block at an angle along a tangent of said strap, said finger having a free distal end overlying said block forming a free space between said distal end of said finger and said block, wherein said finger and said block form a void sized to retain a fishing rod therein substantially parallel to the arm of said user, wherein said finger is unconnected to said block, wherein a common section of said strap passes through said block and said tangential bore while extending around the arm of the user in said first direction.

2. The apparatus of claim 1 wherein said finger comprises an elongate rod.

3. The apparatus of claim 2 wherein said elongate rod has a pliable outer layer.

4. The apparatus of claim 1 wherein said retaining member comprises a sleeve surrounding a portion of said strap.

5. The apparatus of claim 4 wherein said sleeve is slidably movable on said strap.

6. The apparatus of claim 1 wherein said block comprises a tubular member having said bore therethrough sized to receive a portion of said strap therethrough.

7. The apparatus of claim 6 wherein said block is slidably movable on said strap.

8. The apparatus of claim 1 wherein said strap includes a length adjustment.

9. The apparatus of claim 8 wherein said length adjustment is selected from the group consisting of hook and loop fasteners, buckles or frictional adjusters.

10. The apparatus of claim 1 wherein said strap includes padding disposed on an interior surface thereof.

* * * * *